United States Patent
Lewis et al.

(10) Patent No.: US 7,352,832 B1
(45) Date of Patent: Apr. 1, 2008

(54) METHOD AND IMPLEMENTATION FOR ADAPTIVE SYMBOL DECISION MAPPING

(75) Inventors: Michael E. Lewis, Hartville, OH (US); David M. Theobold, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 747 days.

(21) Appl. No.: 10/373,277

(22) Filed: Feb. 24, 2003

(51) Int. Cl.
*H04L 27/08* (2006.01)
*H04B 1/10* (2006.01)

(52) U.S. Cl. ..................................... 375/345; 375/346

(58) Field of Classification Search ................ 375/337, 375/341, 240.27, 317, 287, 322, 229, 285, 375/345, 346
See application file for complete search history.

(56) References Cited

U.S. PATENT DOCUMENTS

| | | | | |
|---|---|---|---|---|
| 5,537,439 A | * | 7/1996 | Choi ........................... | 375/232 |
| 6,002,723 A | * | 12/1999 | Chethik ....................... | 375/317 |
| 6,246,722 B1 | * | 6/2001 | Velez et al. ................. | 375/261 |
| 6,288,610 B1 | * | 9/2001 | Miyashita ................... | 330/149 |
| 6,301,315 B1 | * | 10/2001 | Li .............................. | 375/346 |
| 7,016,401 B1 | * | 3/2006 | Smith et al. ................ | 375/222 |
| 7,197,090 B1 | * | 3/2007 | Berger et al. ............... | 375/317 |
| 2004/0184563 A1 | * | 9/2004 | Bach et al. ................. | 375/324 |

* cited by examiner

*Primary Examiner*—Don N. Vo
(74) *Attorney, Agent, or Firm*—Tucker Ellis & West LLP (57) ABSTRACT

A method and implementation are disclosed for reducing signal distortion. A symbol detector is provided for establishing at least one decision boundary and assigning symbols extracted from a received signal to constellations of symbols separated by the at least one decision boundary. A quality measure implementation is provided for determining an error rate of the output of the symbol detector with respect to the at least one decision boundary. A boundary generator is provided for receiving the error rate and generating parameters that are fed back to the symbol detector to vary the decision boundary positions and shapes, so as to reduce the error rate of the symbol detector.

18 Claims, 10 Drawing Sheets

METHOD AND IMPLEMENTATION FOR ADAPTIVE SYMBOL DECISION MAPPING

BACKGROUND

The present invention is directed to the field of digital telecommunications, particularly systems that employ complex channel modulation techniques. In signal transmission, digital data is typically modulated onto an analog carrier, such as with M-PSK (M-ary Phase Shift Keying) or QAM (Quadrature Amplitude Modulation). In such schemes, it is typical to modulate data into two non-interfering orthogonal signal paths, I and Q (In-phase and Quadrature).

Figure 1A:
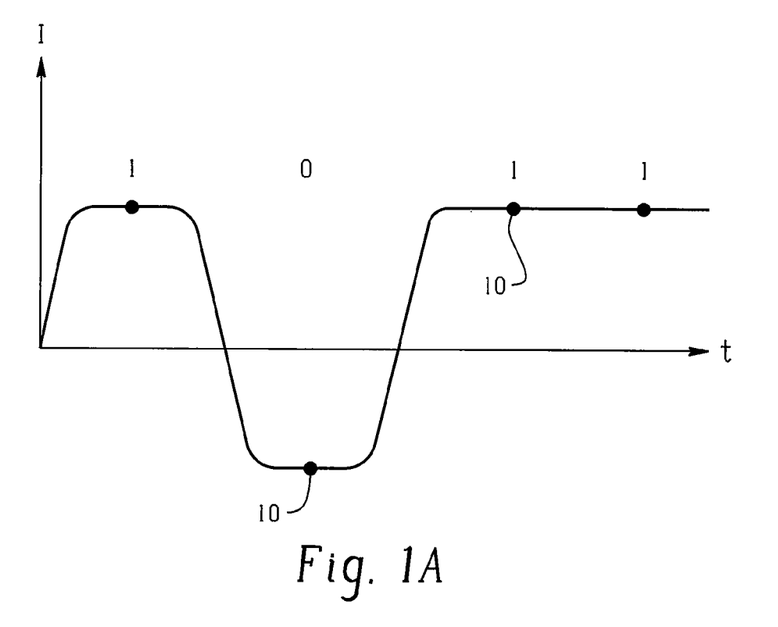
FIGS. 1A, 1B, 1C and 1D are respective depictions of I and Q subcarriers and symbol constellation plots in a complex plane for a BPSK system.
Figure 1B:
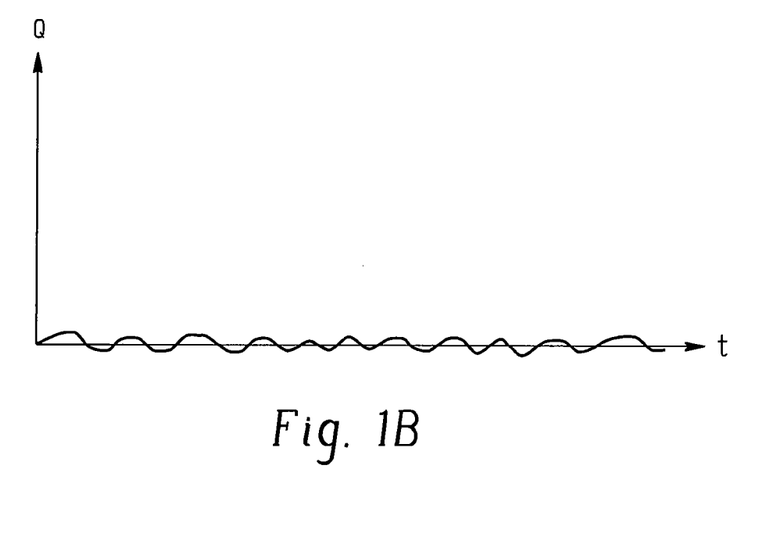

By way of example, a Binary Phase Shift Keying (BPSK) scheme is depicted in FIGS. 1A-1D. During reception of the signal, as shown in FIG. 1A, the analog subcarrier signal is demodulated at the receiver into digital data by taking samples 10 at predetermined intervals. If a positive voltage is detected, a digital value of "1" is indicated. A negative voltage indicates a digital value of "0." The samples 10 are taken at predetermined intervals at which time a sample decision is made, derived from a clock reference, which is either provided by a local reference within the receiver or is obtained from a clock synchronizer using the demodulated signal itself. The clock reference is presumed accurate so as to not degrade the error performance of the receiver.

Figure 1C:
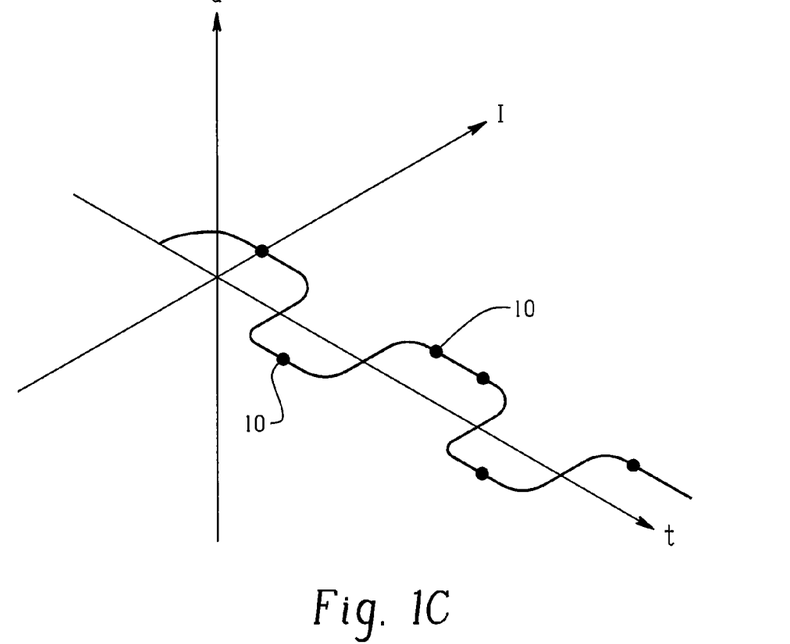
Figure 1D:
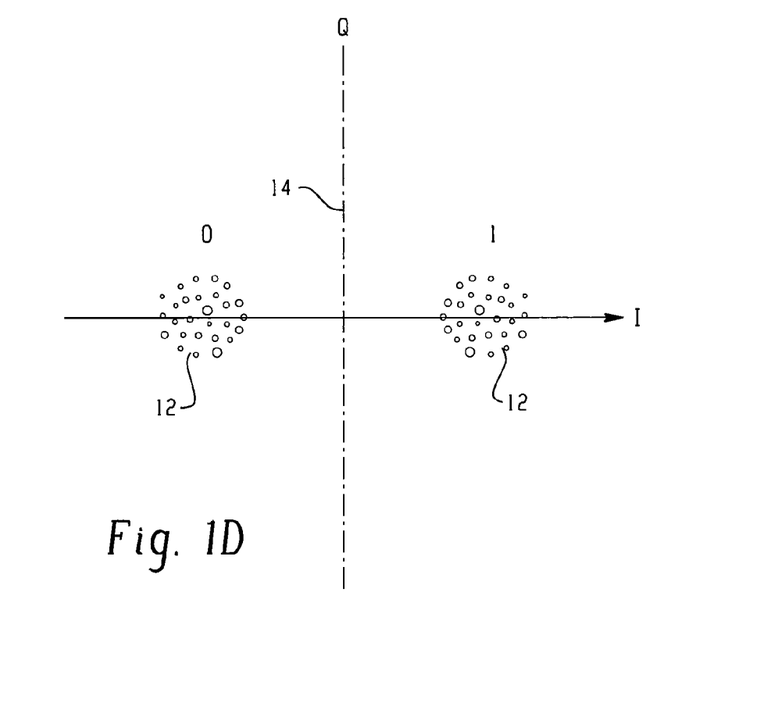

The I and Q amplitude axes can be plotted so as to define a complex plane. As is commonly understood in digital communications, a pair of simultaneous I and Q samples define a "symbol." In a BPSK system, as shown in FIG. 1D, each symbol that can be mapped to the complex plane as one of the digital set {0,1}. But as depicted in FIG. 1C, a time-varying stream of symbols is continuously modulated onto the I and Q subcarriers. Thus, a time-summation of symbols can be seen as a "constellation" 14 in the complex plane, as shown in FIG. 1D.

In a typical digital communications receiver, the decision is made in a decision circuit (typically called a Symbol Detector or Slicer) that reduces one complex symbol of a demodulated waveform into a digital number. In a soft decision receiver this decision may alternatively be in the form of an analog, or multi-bit digital word, representation of the position of the symbol decision on the complex plane (which is subsequently used by a decoding process to obtain the corresponding digital number). In any case, the process of correctly deciding how a given symbol maps into a digital number directly affects the error rate and hence the overall performance of the communication system—the better the symbol map decision, the lower the error rate.

Figure 2A:
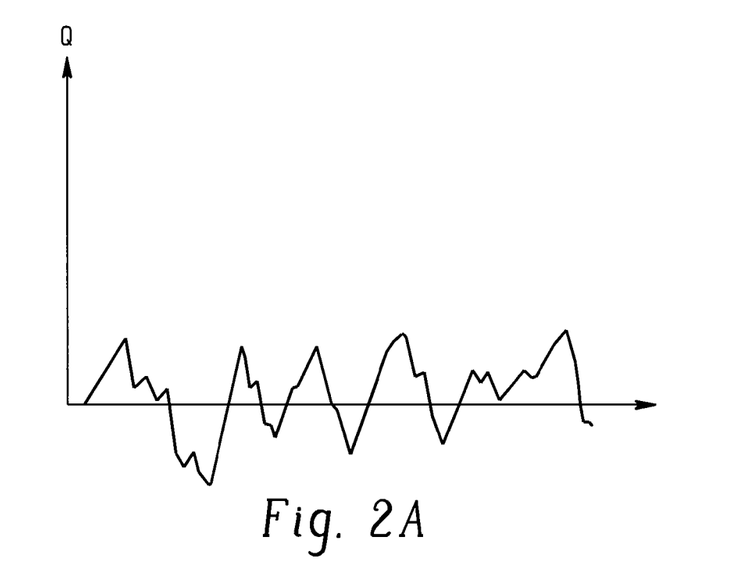
FIGS. 2A, 2B, 2C and 2D respectively illustrate the effects of noise and distortion on a symbol constellation in a BPSK system.
Figure 2B:
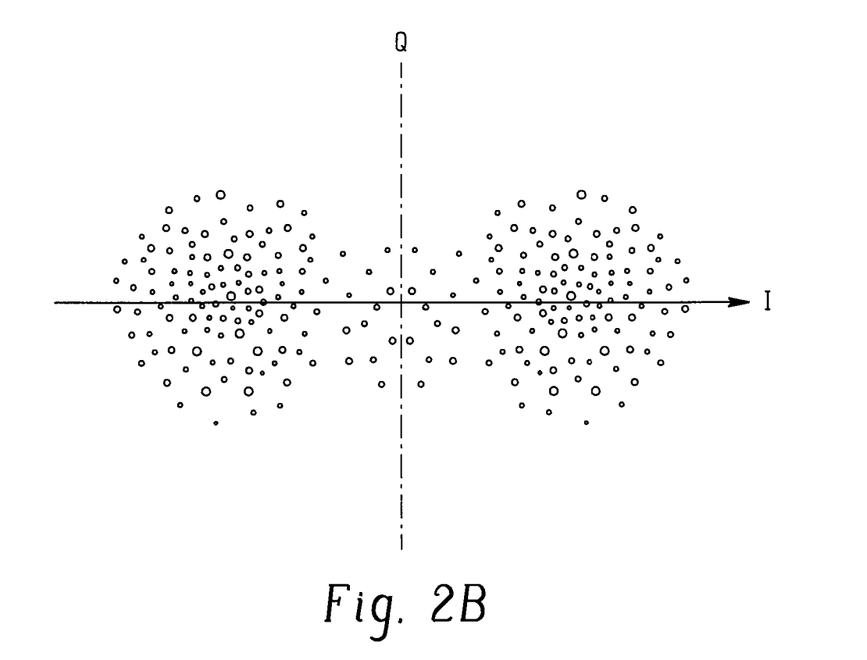
Figure 2C:
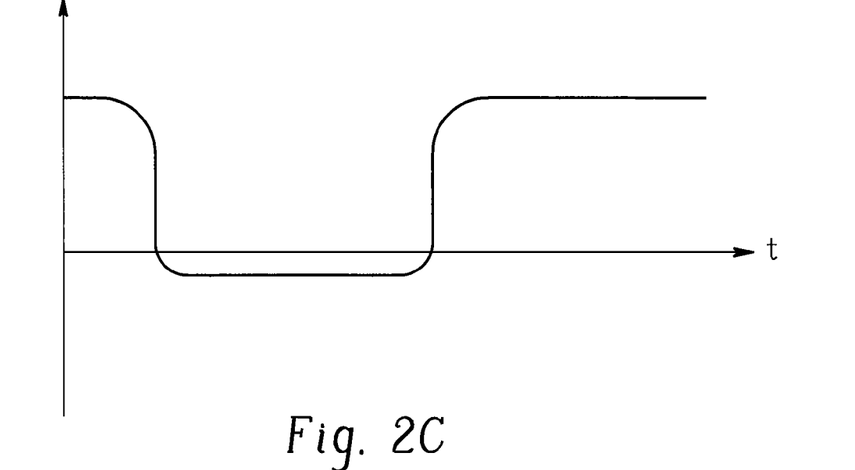
Figure 2D:
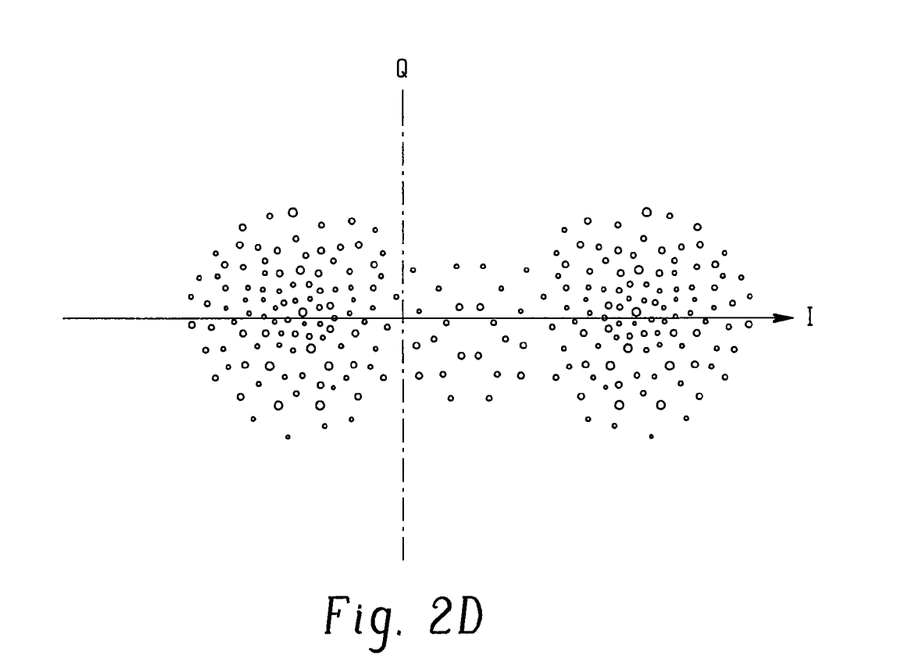

Due to noise in the analog carrier signal, the symbols can vary in amplitude in such a way that the constellations 14 are distributed within the complex plane. Thus, the decision circuit effectively establishes a decision boundary 14 in the complex plane to distinguish between symbols representing a digital "1" and a "0." Factors such as noise and distortion can create difficulties in establishing a decision boundary, thereby increasing the signal's bit-error rate (BER). As shown in FIGS. 2A and 2B, noise on either the I or Q channels can make the constellations 14 more diffuse so that the decision boundary is unclear. As shown in FIGS. 2C and 2D, in BPSK a DC (Direct Current) offset will shift the decision boundary to favor one or the other symbol. But considering the effects of noise and filtering, the slicer is effectively "off-center," and some symbols will be incorrectly assigned to the wrong side of the decision boundary, resulting in an excessive increase in the bit-error rate.

Figure 3A:
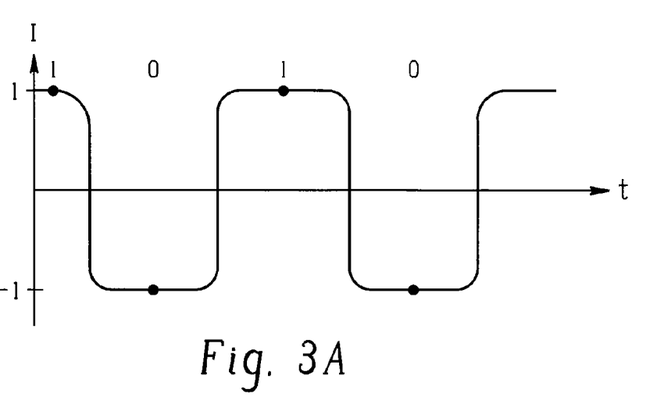
FIGS. 3A, 3B and 3C respectively show I and Q subcarriers and constellations for a QPSK system.
Figure 3B:
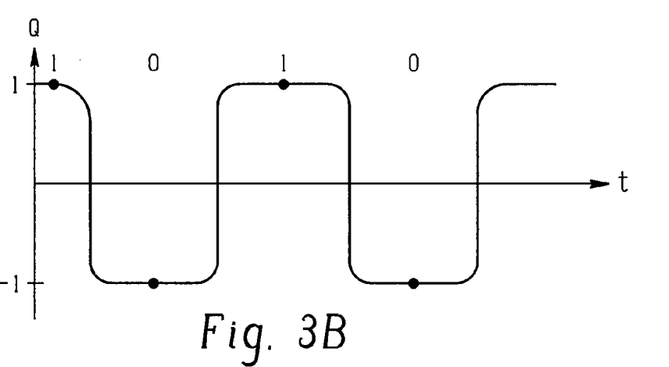
Figure 3C:
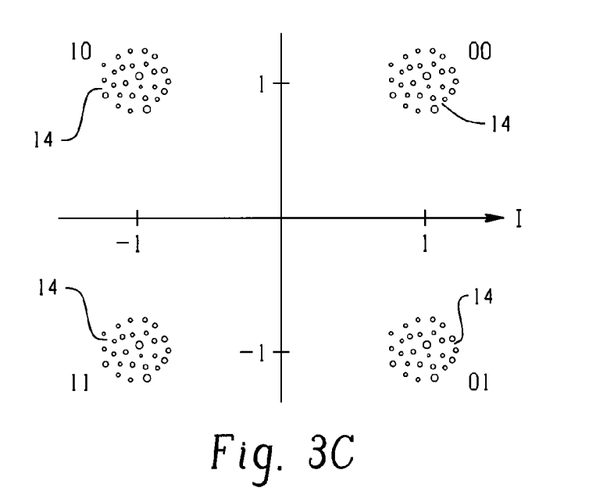
Figure 4A:
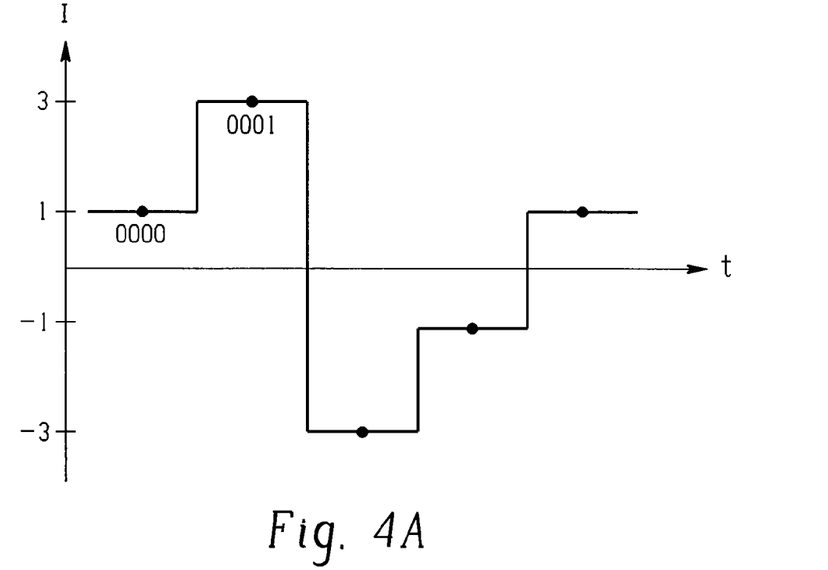
FIGS. 4A, 4B and 4C respectively show I and Q subcarriers and constellations for a 16QAM system.
Figure 4B:
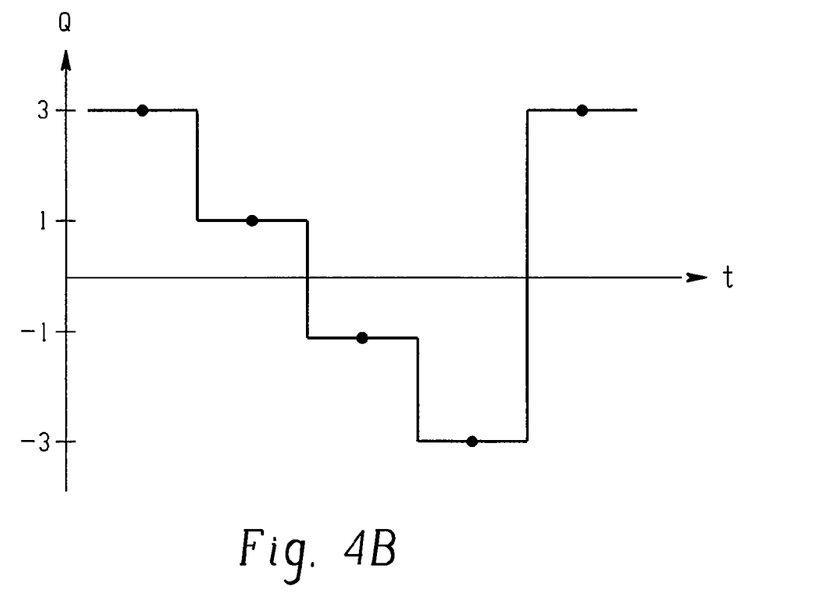
Figure 4C:
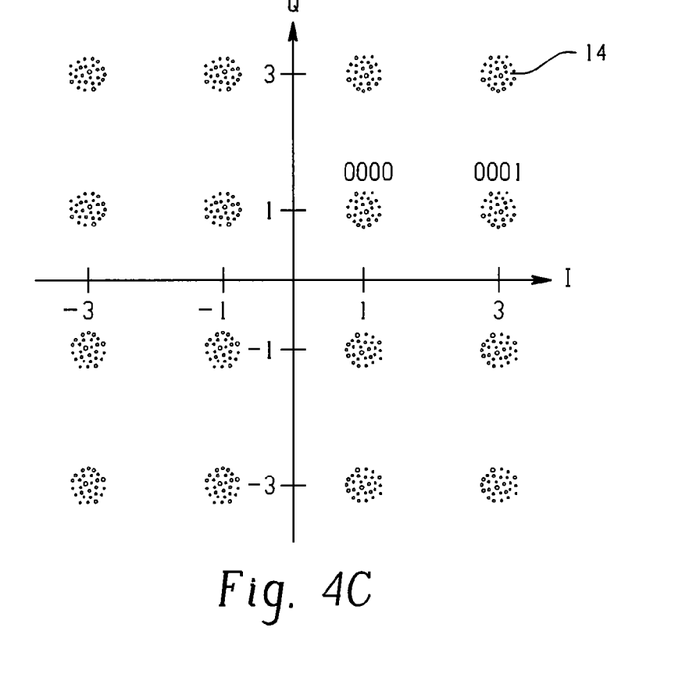

In a typical system, a symbol decision circuit maps the symbols into digital numbers on a one-to-one basis. As shown above, in a BPSK (Bi-Phase Shift Keying) system, the two complex half-planes are mapped to the set {0,1}. In higher order schemes, such as QPSK (Quadrature Phase Shift Keying) and QAM (Quadrature Amplitude Modulation), the problems with noise and distortion are increased. As shown in FIGS. 3A, 3B and 3C, with QPSK, both the I and Q channel carry a single-bit signal, so that the symbols in each constellation 14 fall within one of four quadrants in the complex plane, and are mapped to {00,01,11,10}. In QAM, such as a 16QAM scheme as shown in FIGS. 4A, 4B and 4C, the amplitude of the analog signal is varied between two states (i.e. 1V and 3V) so that both I and Q channel carry a two-bit signal. Each of the resulting symbols is represented by four bits (e.g. {0000, 0001, . . . }), resulting in sixteen constellation points being mapped to the complex plane. This process is similar for the large variety of constellations of M-PSK (M-ary Phase Shift Keying) and QAM (Quadrature Amplitude Modulation).

Since the symbol map is essentially fixed by the analog signal amplitude, the decision process can fall prey to mapping distortions in the modulation and demodulation process, resulting in decision errors. Higher order PSK and QAM modulations become extremely sensitive to noise and distortion since the relative symbol separations become less and less as the number of symbols in the modulation set grows. For example, in 64QAM systems, the decision boundaries between constellations can be quite close, thus making them prone to a high BER in the event of noise and distortion.

Figure 5A:
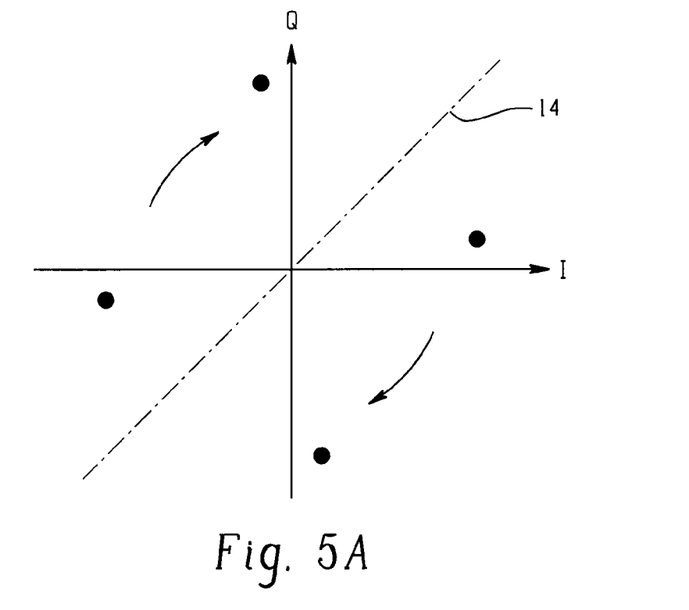
FIGS. 5A, 5B, 5C, 5D, 5E and 5F show the effects of various types of distortion on symbol constellations.
Figure 5B:
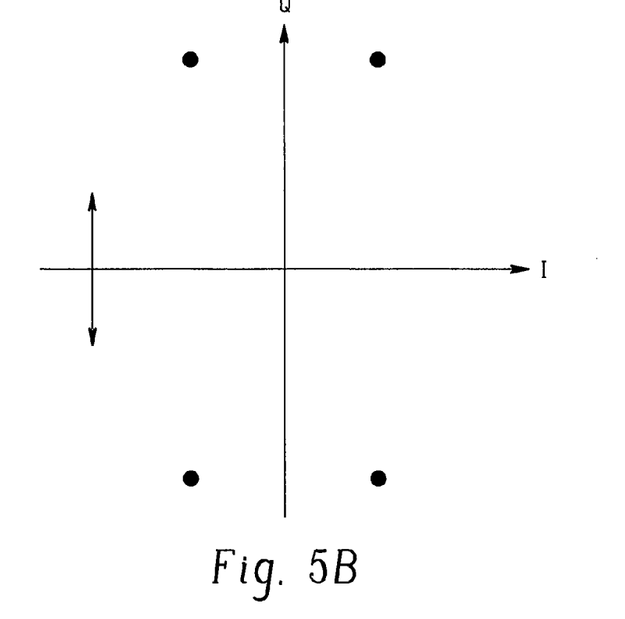
Figure 5C:
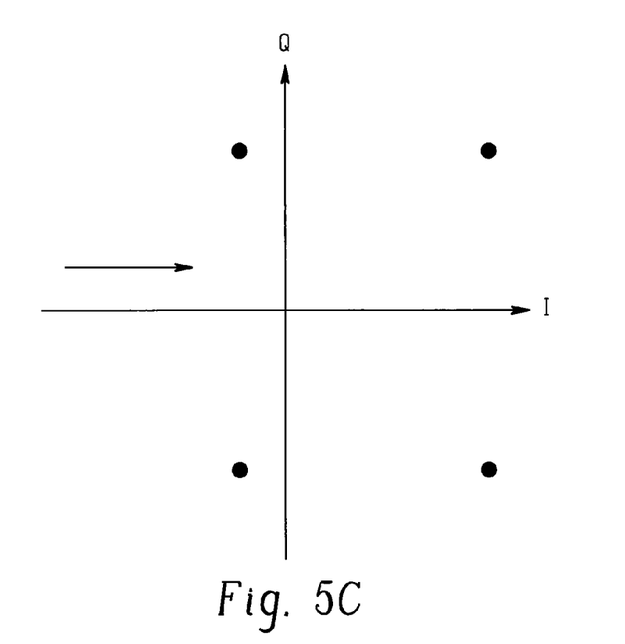
Figure 5D:
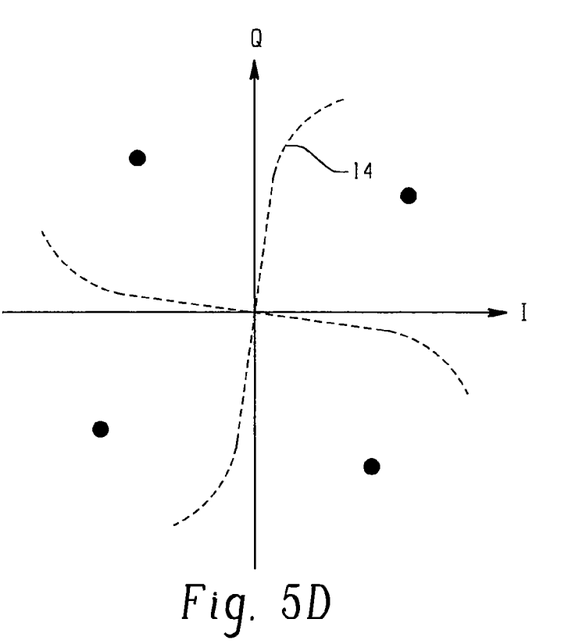
Figure 5E:
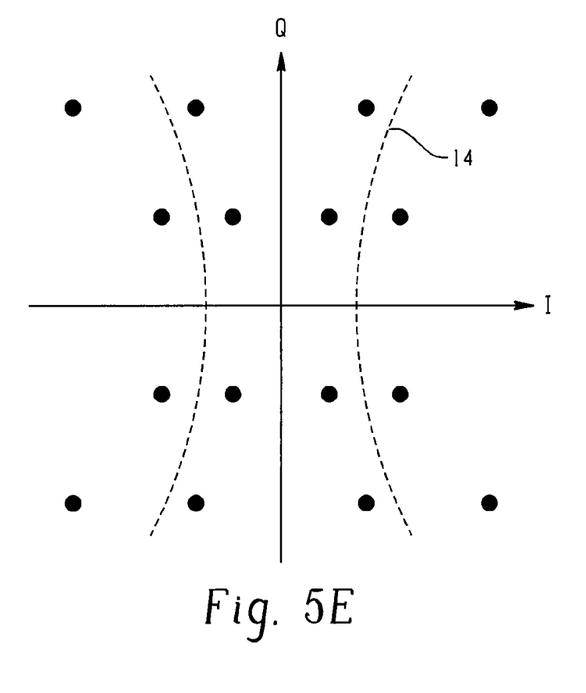
Figure 5F:
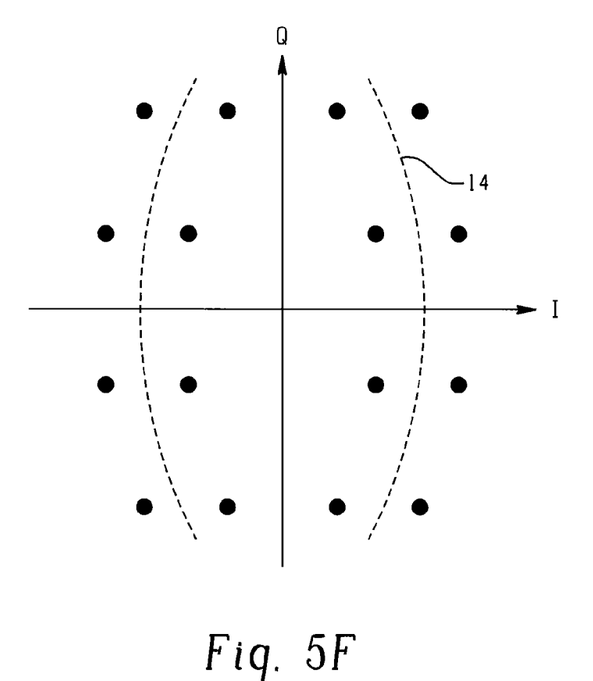

Several types of distortion are shown in FIGS. 5A, 5B, 5C, 5D, 5E, and 5F. As shown in FIG. 5A, phase errors can produce phase rotation in the map. FIG. 5B shows dilation or I-Q unbalance. FIG. 5C shows the effects of translation or DC offset as indicated in the earlier BPSK example. FIG. 5D shows S-curve distortion resulting from a traveling wave tube or similar device. FIGS. 5E and 5F respectively show "pincushion" and "barrel" distortion. Other types of distortion include "skew" or "leaning," AM-to-PM distortion from amplitude-induced phase modulation, and AM-to-AM or trapezoidal distortion from non-linear signal amplification, resulting in unequal amplitude gain in one dimension. In a real scenario, mapping errors may result from any combination of these types of distortion.

Some techniques are known for correcting map distortion. Typically, much care is taken in the modulation, demodulation, filtering, and AGC (Automatic Gain Control) processes of the transmit/receive chain in order to minimize these distortions in the first place. Separate AGC functions may be included in the receiver after demodulation (on the in-phase (I) and quadrature (Q) channels) to minimize DC offset and I-Q unbalance. Some communications systems actually measure symbol distortion in the receiver and transmit those measurements back to the transmitter, where "pre-distortion" is used in an attempt to minimize the net system distortion. Tight phase control of the carrier recovery process also aids in minimizing phase rotation.

However, there are many practical scenarios in which there is no available a priori information about potential sources of signal distortion. Therefore, in a practical system that must receive digital modulations from a variety of transmitters in unknown states of age, power regulation, nonlinear amplification, and so forth, symbol decision mapping will inevitably exhibit errors induced by symbol map distortions. Thus, the existing techniques cannot adequately correct map distortion, resulting in unsatisfactory bit-error rates.

SUMMARY OF THE INVENTION

The difficulties and drawbacks associated with previous systems are overcome by the method and implementation of the present invention for reducing signal distortion. A symbol detector is provided for establishing at least one decision boundary and assigning symbols extracted from a received signal to constellations of symbols separated by the at to least one decision boundary. A quality measure implementation is provided for determining an error rate of the output of the symbol detector with respect to the at least one decision boundary. A boundary generator is provided for receiving the error rate and generating parameters that are fed back to the symbol detector to vary the decision boundary positions and shapes, so as to reduce the error rate of the symbol detector.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE INVENTION

The present invention comprises a symbol decision circuit for backing out any distortions of a received symbol constellation, and thereby produce an undistorted map. The invention accomplishes adaptive symbol decision mapping by modifying symbol decision boundaries in a complex plane so as to reduce the effects of symbol constellation distortion on the performance of the digital communication system.

Figure 6:
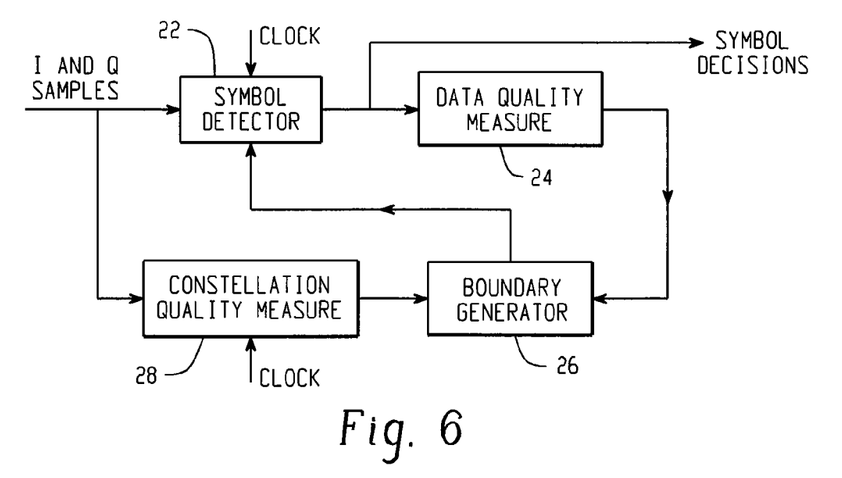
FIG. 6 is a block diagram depicting a decision circuit in accordance with the present invention.

The symbol decision circuit 20 of the present invention is shown in FIG. 6. The in-phase and quadrature (I and Q) samples from a receiver's demodulator are presented to a symbol detector 22. Within the symbol detector 22, symbol decisions are made at the clock rate based upon where the complex samples fall relative to presumed initial decision boundaries. The output of the symbol detector 22 is processed by a data quality measure 24 that determines the bit-error rate of the symbols. The output of the data quality measure circuit 24 is received by a boundary generator 26 that generates specified parameters so as to "warp" or vary the decision boundary positions and shapes. The boundary generator 26 can also make parameter selections based upon outputs received from a constellation quality measure circuit 28, also driven at the clock rate, that evaluates the topology of the overall constellation of symbols. The constellation quality measure circuit 28 works alternatively or in addition to the output of the data quality measure circuit 24. The output of the boundary generator 26 is fed back to the symbol detector 22 so as to suitably adjust the symbol decision. In this way the position and shape of the decision boundaries 14 can be "warped" or otherwise made variable in order to compensate for symbol map distortion, as generally indicated in the examples of FIGS. 5A, 5D, 5E and 5F.

A number of implementations can be employed to obtain the present invention, and the examples following herewith are understood to be exemplary and not limiting. For example, packet error rate or preamble quality may be employed as measures of data quality in the data quality measure circuit 24. Symbol map distortion is typically a varying phenomenon and can be observed over a span of thousands of symbol lengths. Hence error rate measures and variation in the trends thereof are suitable indicators of distortion effects. On the other hand, in the shorter-term the constellation quality measure circuit 28 can assess constellation quality with measures of error vector difference or of the Euclidean distances between the centroids of the separate symbol constellation clusters. A time-variation in the centroid positions of a particular symbol constellation can be used as an indicator of time-variations in map distortion.

In a symbol map as shown in the figures, a particular decision boundary can be plotted as a function of the coordinate system of the complex plane. As will be appreciated, such a function can be expressed as a polynomial equation having the form:

$$f_i = a_0 + a_1 x + a_2 x^2 + \ldots a^n x^n$$

for horizontal boundaries and $$g_i = b_0 + b_1 y + b_2 y^2 + \ldots b^n y^n$$

for vertical boundaries

Measurements of data quality or constellation quality measures can be used to generate the coefficients $a_n(b_n)$ of the decision boundary functions $f_i(g_i)$ for any number of decision boundaries. Desirably, an adaptive technique would be employed with applicability to a wide variety of PSK and QAM systems. For example, a simple linear search algorithm would be effective. As applied to BPSK or QPSK the invention may initially apply I-Q AGC in which the I and Q decision boundaries would incrementally move back and forth until the quality measure reaches a maximum. In another aspect of the invention, for more complex constellations, "brute force" coefficient tuning (as known as "exhaustive search") may be used to adapt the boundaries. Other error measurement techniques such as "least squares" or "gradient search" can also be employed. Such functionality can also be obtained using a neural network with associative capabilities that enable the network to "learn" and thereby make decision corrections. In any event, such methods could be used to find the coefficients of a function characterizing the minimum obtainable bit-error rate.

In another aspect of the invention, decision boundary variations can be made using a "genetic algorithm" or "simulated annealing" in the boundary generator 26 to vary the coefficients to create arbitrary boundary shapes. For example, the boundaries would be specified as a function having polynomials of arbitrary order, typically order three or lower. The genetic or annealing algorithms are then used to manipulate the coefficients in order to arrive at a set that maximizes the quality measures.

In still another aspect of the invention, an analytic method can be used involving the use of a symbol-center-of-mass calculation followed by appropriate matrix transformations. The symbol-center-of-mass calculation is accomplished by applying a moving two-dimensional (2-D) averager. In practice one maintains a complete plot of all past constellation points that have been received since some specific time in the past. This could be an appropriately sized first-in-first-out (FIFO) register. The plot is conceptual, implemented as a collection of the 2-D symbols held in the FIFO. The 2-D averager is applied to every grid point in the constellation map. The grid reflects the quantization of the analog to digital conversion process. Those points in the constellation map where symbols are aggregated will have a large spatial average indicating symbol locations. A "center-of-mass" calculation is performed on these identified areas to more accurately determine the symbol positions. The points thus determined are used to compute translations, skew transformation matrices, and dilation matrices to map the distorted received symbols onto an undistorted constellation map. This would then allow standard techniques such as soft-symbol decoding to be applied much more accurately. The form of a rotation/translation matrix is given by $$\vec{r}' = A\vec{r}$$

$$A = \begin{bmatrix} \cos\varphi & -\sin\varphi & h \\ \sin\varphi & \cos\varphi & k \\ 0 & 0 & 1 \end{bmatrix}$$

where $$\vec{r} = \begin{bmatrix} x \\ y \\ 1 \end{bmatrix} \text{ and } \vec{r}' = \begin{bmatrix} x' \\ y' \\ 1 \end{bmatrix}$$

where phi is the angle of rotation and h (k) is the translation in the x(y) coordinates. This can be combined with a dilation/contraction operation such as $$B = \begin{bmatrix} a & 0 & 0 \\ 0 & b & 0 \\ 0 & 0 & 1 \end{bmatrix}$$

that can be combined with the previous transformation to achieve rotation, dilation/contraction and translation.

$$\vec{r}' = BA\vec{r}$$

In keeping with the adaptive methods described above one could make the rotation angle, the translation variables and the dilation/contraction coefficients functions of position of x' and y' thus making it capable of handling very complex nonlinear distortion. The coefficients of these functions would be modified by the same type of adaptive algorithms mentioned above.

The adaptive symbol decision mapping method and apparatus of the present invention is generally applicable to any type of PSK or QAM symbol detector. The invention can greatly reduce symbol map distortion without using specific design methodologies that might employ I-Q AGC, residual carrier tracking, feedback linearization, and other approaches found in current receiver design practice. Although these other methods can remove inter-symbol interference etc., they do not address complex nonlinear distortions of the constellation. It should be appreciated that the present invention can preferably be implemented as software, but it can also be implemented as hardware or any combination thereof.

Many benefits are obtainable with the adaptive symbol decision mapping of the present invention in a digital communications receiver. The invention enables any particular receiver to tolerate equipment performance variability in conjunction with a variety of unknown transmitters. Also, the receiver including the present invention, since it would be adaptable, can be designed with relaxed distortion specifications, for example with respect to the I-Q AGC or carrier tracking circuits, resulting in lower cost or complexity. Additionally, a receiver with an adaptive symbol decision mapper in accordance with the present invention effectively "tunes" on the fly. It is thus responsive to propagation or equipment changes that could modify the distortion characteristics of the modulated waveforms. This performance is particularly beneficial to streaming data systems. Further, there is no requirement that a priori distortion information be returned to the transmitter in order to minimize the effects of symbol map distortion. Thus, there is no longer a need to feed back pre-distortion control information to the transmitter, thereby reducing complexity and expense. And still further, an adaptive receiver in accordance with the present invention would optimize throughput for any system for which it decreases bit error rate.

In view of the above, it is clear that the adaptive symbol decision mapping of the present invention is significantly more robust to symbol decision map distortion than current "static map" implementations. It additionally can supplant and/or reduce the requirements of many of the specialized distortion mitigating techniques needed in receivers, such as I-Q AGC, residual carrier offset tracking, and other types of pre-distortion techniques. Since the invention preferably contemplates an all-computational solution, there is no particular reliance on specific hardware circuits. Hence, the solution of the present invention can potentially be modified as the requirements of a receiver change or, in fact, on the fly when faced by diverse types of symbol map distortion. In this way, the present adaptive boundary algorithm may modify its operation depending upon the nature of the distortion, such as phase rotations as opposed to amplitude unbalances, so that the nature of the distortion can simplify the scope of the computations.

As described hereinabove, the present invention solves may problems associated with previous type systems. However, it will be appreciated that various changes in the details, materials and arrangements of parts that have been herein described and illustrated in order to explain the nature of the invention may be made by those skilled in the area within the principle and scope of the invention will be expressed in the appended claims.

We claim:

1. An apparatus for reducing signal distortion comprising:
   a symbol detector that reduces complex symbols of a demodulated waveform to digital numbers based on at least one decision boundary;
   a quality measure implementation coupled to the output of the symbol detector for determining an error rate of the symbols; and a boundary generator coupled to the quality measure for receiving the error rate from the quality measure and generating parameters that are fed back to the symbol detector;

wherein the symbol detector is responsive to the parameters received from the boundary generator to vary the at least one decision boundary to reduce the error rate of the symbol detector;

wherein the symbol detector varies the decision boundary position and shape in conjunction with a function of a coordinate system in a complex symbol plane; and wherein the function is determined by a symbol center-of-mass calculation followed by appropriate matrix transformations, so as to transform symbol positions from a distorted constellation map onto an undistorted constellation map.

2. The apparatus of claim 1, further comprising a demodulator in a receiver for producing samples from subcarrier signals to present to the symbol detector.

3. The apparatus of claim 1, wherein the symbol detector comprises an implementation for making symbol decisions at a clock rate relative to initial decision boundaries.

4. The apparatus of claim 1, wherein the quality measure implementation is a data quality measure implementation that determines the bit-error rate of the symbols with respect to the at least one decision boundary.

5. The apparatus of claim 4, wherein the data quality measure implementation includes an implementation for detecting at least one of packet error rate, preamble quality, and time-dependent variations so as to detect distortion effects.

6. The apparatus of claim 1, wherein the quality measure implementation is a constellation quality measure circuit, driven at a clock rate, which evaluates the error rate of the overall constellation of symbols.

7. The apparatus of claim 1, wherein the constellation quality measure implementation includes an implementation for measuring at least one of error vector difference, Euclidean distances between the centroids of the separate symbol constellation clusters, and time-variations in the centroid positions of a particular symbol constellation, so as to detect distortion effects.

8. The apparatus of claim 1, wherein the function comprises a polynomial equation having terms with coefficients selected to produce a minimum obtainable error rate in the quality measure implementation.

9. The apparatus of claim 8, wherein the coefficients are obtained with at least one of I-Q automatic gain control, exhaustive search, least squares, gradient search, a neural network algorithm, a genetic algorithm, and a simulated annealing algorithm.

10. The apparatus of claim 1, wherein the symbol detector, quality measure implementation and boundary generator are implemented by at least one of software and hardware.

11. A method for reducing signal distortion comprising the steps of:

establishing at least one decision boundary;

assigning symbols extracted from a received signal to digital numbers based on the at least one decision boundary;

determining an error rate of the symbols;

varying the at least one decision boundary to acquire a new at least one decision boundary;

assigning symbols extracted from the received signal to digital numbers based on the new at least one decision boundary;

determining an error rate of the symbols extracted based on the new at least one decision boundary; and selecting one of a group consisting of the at least one decision boundary and the new at least one decision boundary based which decision boundary produces a lower error rate;

wherein the step of varying the decision boundary position and shape is performed by determining a function of a coordinate system in a complex symbol plane; and wherein the step of determining the function comprises performing a symbol center-of-mass calculation followed by appropriate matrix transformations, and thereby transforming symbol positions from a distorted constellation map onto an undistorted constellation map.

12. The method of claim 11, further comprising a step of demodulating subcarrier signals to produce samples for the step of assigning symbols.

13. The method of claim 11, wherein the step of determining an error rate comprises determining a bit-error rate of the symbols with respect to the at least one decision boundary.

14. The method of claim 13, wherein the step of determining a bit-error rate of the symbols comprises detecting at least one of packet error rate, preamble quality, and time-dependent variations so as to detect distortion effects.

15. The method of claim 11, wherein the step of determining an error rate comprises evaluating an error rate of an overall constellation of symbols.

16. The method of claim 15, wherein the step of evaluating an error rate of an overall constellation of symbols comprises measuring at least one of error vector difference, Euclidean distances between the centroids of the separate symbol constellation clusters, and time-variations in the centroid positions of a particular symbol constellation, so as to detect distortion effects.

17. The method of claim 11, wherein the step of determining the function comprises determining a polynomial equation and selecting coefficients to produce a minimum obtainable error rate in an iteration of the step of measuring the error rate.

18. The method of claim 17 wherein the coefficients are selected by implementing at least one of I-Q automatic gain control, exhaustive search, least squares, gradient search, a neural network algorithm, a genetic algorithm, and a simulated annealing algorithm.

* * * * *